Aug. 25, 1970  W. ODENWALD  3,525,169
CREATURE REPELLER
Filed Oct. 25, 1967
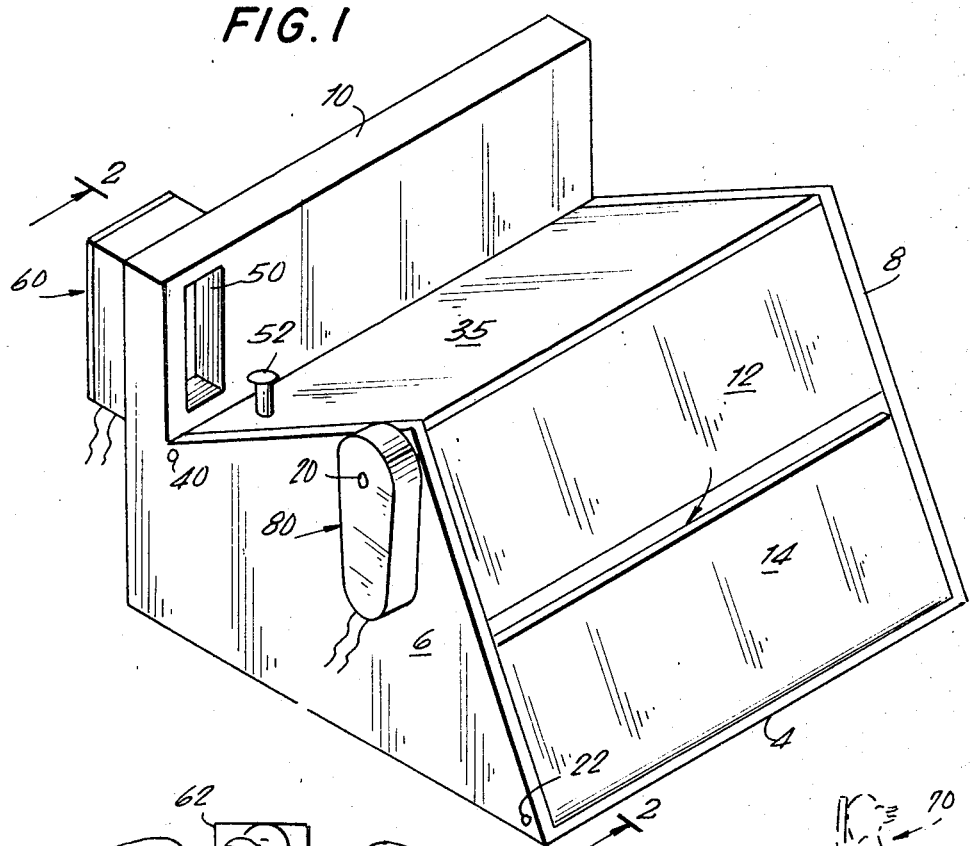
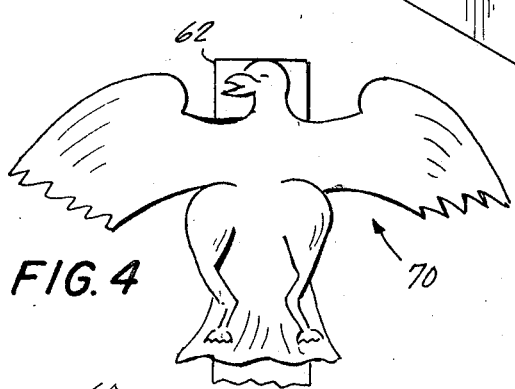
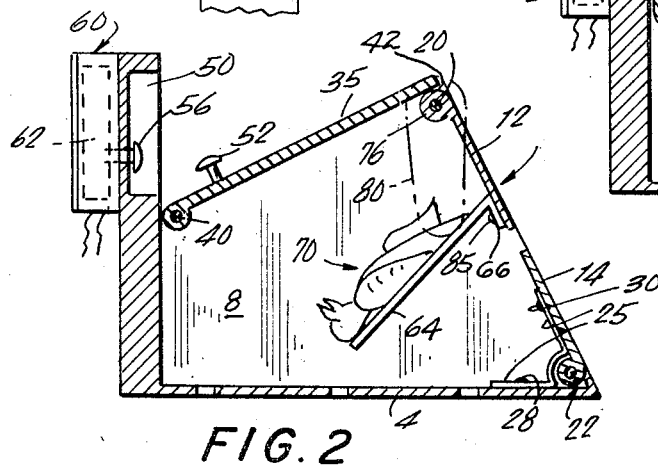
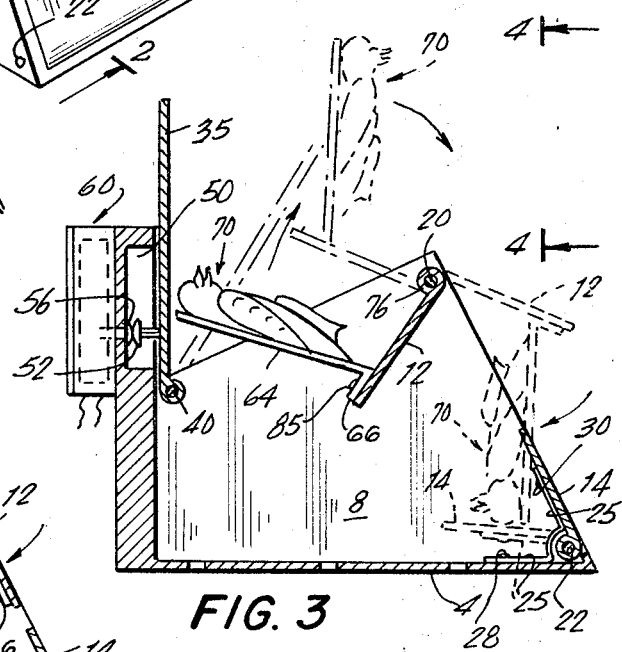
INVENTOR.
BY William Odenwald
ATTORNEYS

United States Patent Office 3,525,169
Patented Aug. 25, 1970

3,525,169
CREATURE REPELLER
William Odenwald, 830 Irvington Ave.,
Elizabeth, N.J. 07208
Filed Oct. 25, 1967, Ser. No. 678,106
Int. Cl. G09f 27/00
U.S. Cl. 40—106.3      4 Claims

ABSTRACT OF THE DISCLOSURE

An apparatus for frightening creatures, especially fowl, useful in protecting crops and newly sown fields. The device comprises means for enabling a facsimile of the enemy of the creature to be scared to appear and disappear and accompanied with a sound characteristic of the sound emitted by the enemy.

BACKGROUND OF THE INVENTION

Field of the invention

This invention relates to a device for frightening away creatures especially those which do damage to crops or cause an unsightly appearance to walks, statues and the like. This invention is particularly directed to a means for frightening away birds, fowl or other animals.

Discussion of the prior art

For many years several devices have been used to frighten away birds from ground which has been recently sown with seed or from fields containing vegetation in the course of maturing. The scarecrow is the typical and most popular of these devices. The scarecrow has been found to be initially effective in scaring the birds away from the field. However, the birds fly to nearby trees where they perch and observe the scarecrow. They observe that it remains rigid and motionless in the field for hours keeping the same expression and not threatening any wildlife that passes by. The birds then experiment with the scarecrow and leave the trees, flying near the scarecrow. The scarecrow still remains rigid and motionless. After some period of time, the birds lose any fear of the scarecrow and even perch on it. When nothing happens by way of motion or sound to scare them away they go for the seed in the field. Thus, the scarecrow has only an initial positive effect in guarding the field.

One other popular means for keeping birds away from lawns freshly seeded is tying strips of cloth on nearby branches of trees and on strings encircling the seeded area. This gives the motion desired but the birds are not afraid of cloth especially since it makes no sound like their feared enemy. Eventually the birds get to the seed.

Hence it has long been desired to provide a safe, humane way of keeping birds or other creatures away from certain areas permanently.

OBJECTS OF THE INVENTION

It is an object of this invention, therefore, to provide a means for frightening away creatures.

It is another object of this invention, therefore, to provide means for frightening away creatures, especially birds, from a field or the like in a safe humane manner.

It is another object of this invention, therefore, to provide a means which permanently keeps birds or other animals away from fields by constantly creating a fear in the bird or animal of imminent harm if it approaches the field.

These and other objects and advantages will become apparent from the following complete description, accompanying drawings, and appended claims.

STATEMENT OF THE INVENTION

Broadly, this invention contemplates an apparatus for frightening creatures which comprises a container having therein at least one facsimile of the complementary predator of the creature to be frightened and means for causing said facsimile to periodically appear out of said container and return to said container.

In a particularly desirable embodiment, this invention contemplates an apparatus for frightening creatures which comprises a container having therein at least one facsimile of the complementary predator of the creature to be frightened, said facsimile mounted at one end thereof on a horizontally rotatable member and means for causing said horizontally rotatable member to rotate thereby causing said facsimile to appear out of said container and disappear into said container. Preferably, the facsimile is affixed to a front wall of said container which is rotatable about a rod positioned across the width of the container and the container contains a top piece engageable with a sound-making means whereby rotation of the rod causes the facsimile to rise out of the container in turn causing the top piece to be removed from over the container and to engage a sound-making apparatus. The sound emitted by the sound-making apparatus is that characteristic of the enemy of the creature being scared.

BRIEF DESCRIPTION OF THE DRAWINGS

In order to more readily understand and appreciate the present invention, reference should be made to the accompanying drawings, in which:

FIG. 1 is a perspective view of the apparatus pursuant to the present invention in closed position;

FIG. 2 is a sectional view of the apparatus of FIG. 1 taken along the line 2—2 of FIG. 1;

FIG. 3 is a view similar to FIG. 2 showing the apparatus in use with the facsimile of the creature enemy shown twice in phantom; and FIG. 4 is a view taken along the line 4—4 of FIG. 3 showing a typical complementary predator.

DESCRIPTION OF PREFERRED EMBODIMENTS

A preferred embodiment of the present invention is shown in the accompanying drawings in which the device is generally represented by reference numeral 2. It comprises a container having a base 4, sides 6 and 8, and back wall 10. Between sides 6 and 8 on the front face of the apparatus are inwardly movable front walls 12 and 14. Wall 12 is pivotable about a fixed rod 20 extending between sides 6 and 8 at the top by virtue of having its top end formed about rod 20. Front wall 14 is pivotable about rod 22 in an inward and downward direction but movement of this wall 14 is limited by base 4. Front wall 14 is held in position as shown in FIGS. 1 and 2 due to spring 25 affixed both to the base 4 and front wall 14 on the inside with fasteners 28 and 30. The bottom of front wall 14 is formed about rod 22. The back 10 of the apparatus runs vertically and is attached, preferably integrally, with base 4. It is provided with a cover 35 which at its end adjacent back 10 is formed about a rod 40. The cover extends over and rests upon the upper edge 42 of front wall 12.

Back wall 10 is provided with a recess 50 through which can pass a sound actuating means 52 in the form of a projection mounted at right angles to and upon the top side of cover 35. In registry with projection 52 and recess 50 is sound actuatable projection 56 affixed to a sound-emitting source. Normally this source is housed in housing 60 and comprises a rubber hollow member having a reed or similar sound-making port connected to it. To the hollow rubber member 62 is affixed projection 56. Thus, when projection 52 engages and pushes projection 56 air is forced out of the hollow rubber member through the reed causing a sound. When the pressure exerted from projection 52 is released, air is permitted to pass into the hollow rubber member causing sound as it enters through the same port as the air was expelled.

Within the container and mounted against front wall 12 is mounting piece 64 affixed to facsimile support 66. Facsimile support 66 depends from mounting piece 64 at an angle less than 90 degrees. Affixed to the upper surface of facsimile support 66 and facing cover 35 is facsimile 70 in inflight position. In the present drawings the facsimile is a hawk although it is to be realized that other birds such as an owl, eagle, etc., can be used and the use of the particular facsimile depends upon the creature to be scared away. It is also to be remembered that the facsimile need not be a bird but can be any other type of creature capable of frightening away another creature. Affixed to the arcuate end 76 of front wall 12 is an electric timer motor 80 which is operable to slowly revolve the front wall 12 about rod 20.

Operation of the apparatus is quite simple. The electric timer motor is electrically connected to a suitable electric power source, although the device can be worked manually, or by mechanical means. The electric motor causes front wall 12 to revolve about rod 20 in the direction of the arrows shown in FIGS. 1, 2 and 3. When the head of the hawk engages cover 35 it causes it to be pivoted toward back wall 10. When back wall 10 reaches cover 35, projection 52 enters recess 50 and engages projection 56 affixed to the sound source in turn causing the emission of a sound characteristic of the hawk. As front wall 12 continues slowly to rotate about rod 20, it permits cover 35 to begin to rotate toward the front of the apparatus, thereby disengaging projection 52 from projection 56 enabling a second emission of a haw-like sound. Cover 35 returns to its normal position of FIG. 1 as front wall 12 continues to rotate. Thereby, the hawk is exposed, in full, as depicted as if in flight and moving. Eventually it moves downward as wall 12 rotates, disappearing within the container.

It is the appearance and disappearance of the complementary predator, particularly when coupled with the sound, that keeps birds and other creatures away from fields and the like. This is probably due to the fact that flight is simulated but never for too long that the bird feels safe that it is inanimate. The device has been found to permanently frighten away several species of birds in a safe, humane manner.

Several modifications to the device of the invention are possible. For instance, several facsimiles can be employed on a conveyor belt which returns the facsimile within the container. Additionally, if desired, the sound-emitting source can be in the form of a phonographic record tape or other sounding device electrically or mechanically actuated. The device is constructed preferably such that the hawk facsimile can be removed and another facsimile inserted over the facsimile support. Alternately, the facsimile, facsimile support and mounting piece 60 can be made as one and affixed to front wall 12 employing fastener 85. It is also to be realized that the device can be assembled whereby the facsimile appears before the frightening sound is heard.

The terms and expressions used herein are terms of illustration and not of limitation as there is no intention, in the use of such terms and expressions, of excluding any equivalents, or portions thereof, as many modifications are possible within the scope of the invention claimed.

I claim:

1. An apparatus for frightening creatures which comprises a container having therein at least one facsimile of the complementary predator of the creature to be frightened, means for causing said facsimile to periodically appear out of said container and return to said container, said container including a front wall, means for affixing said facsimile to said front wall, said front wall being rotatable about a rod positioned across the width of the container, a sound-making means connected to said container, said container comprising a top piece engageable with said sound-making means whereby rotation of said front wall causes said top piece to be moved from over the container and to engage said sound-making means causing the emission of a sound characteristic of that of the enemy of the creature being frightened.

2. An apparatus for frightening creatures according to claim 1, wherein said means for causing said facsimile to periodically appear out of said container and return to said container comprises an electric motor operable to rotate said front wall about said rod.

3. An apparatus for frightening creatures according to claim 2, wherein said sound-making means is a hollow deformable bulb provided with an air ingress-egress having a reed, said bulb engageable by a projection mounted on said top piece.

4. An apparatus for frightening creatures according to claim 3, wherein said bulb is housed adjacent the back wall of said container and has affixed to it a projection engageable by said projection mounted on said top piece, said back wall provided with a recess into which said projection enters.

References Cited

UNITED STATES PATENTS

| 1,167,502 | 1/1916 | Huffman et al. | 40—28.1 |
| 1,686,359 | 10/1928 | Zedler | 40—106.31 |
| 1,741,103 | 12/1929 | France | 46—124 |
| 2,670,956 | 3/1954 | Ganz | 40—106.31 X |
| 2,912,791 | 11/1959 | Cohen | |

FOREIGN PATENTS

| 1,068,992 | 2/1954 | France. |
| 133,247 | 8/1929 | Switzerland. |

EUGENE R. CAPOZIO, Primary Examiner

R. CARTER, Assistant Examiner

U.S. Cl. X.R.

40—28.1; 46—124